United States Patent [19]
Kime et al.

[11] 3,796,108
[45] Mar. 12, 1974

[54] RIGHT ANGLE SPEED REDUCER

[75] Inventors: Donald L. Kime, Dayton; Ronald G. Stogdill, Trotwood, both of Ohio

[73] Assignee: Chemineer, Inc., Dayton, Ohio

[22] Filed: Dec. 18, 1972

[21] Appl. No.: 315,921

[52] U.S. Cl. .............................................. 74/417
[51] Int. Cl. ............................................ F16h 1/20
[58] Field of Search ............................ 74/417, 423

[56] References Cited
UNITED STATES PATENTS
1,106,149  8/1914  Loomis .......................... 74/417 X
2,223,779  12/1940  Bloss ................................ 74/417
2,276,561  3/1942  Bloss ............................ 74/417 X
2,600,555  6/1952  Maier ............................... 74/417

*Primary Examiner*—Leonard H. Gerin
*Attorney, Agent, or Firm*—Biebel, French & Bugg

[57] ABSTRACT

A right angle speed reducer incorporates speed change gears for varying the output shaft speed, spiral bevel gearing, all tapered roller bearings, splash lubrication of all high speed bearings, and a dry well output for the lower output shaft bearing.

6 Claims, 6 Drawing Figures

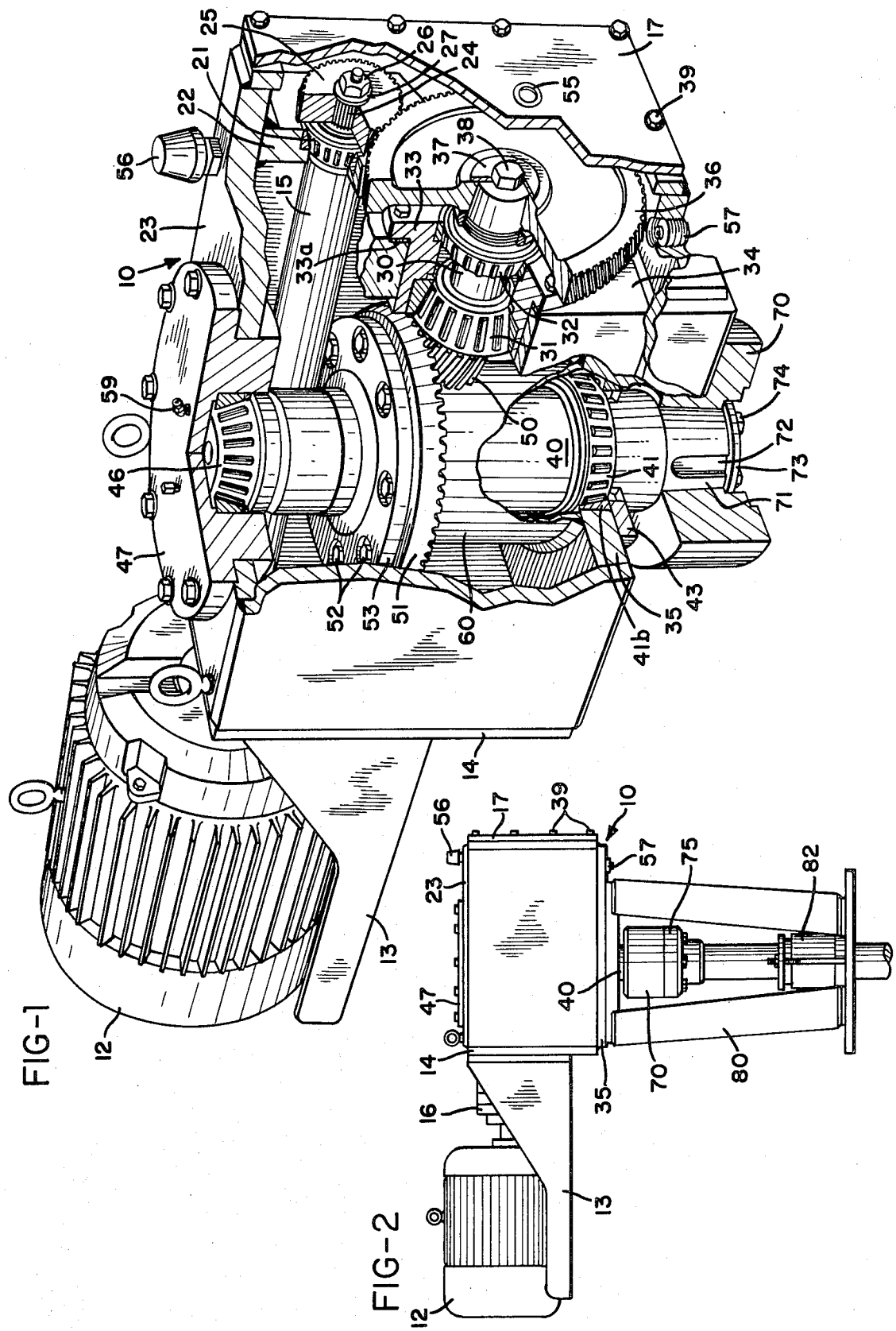

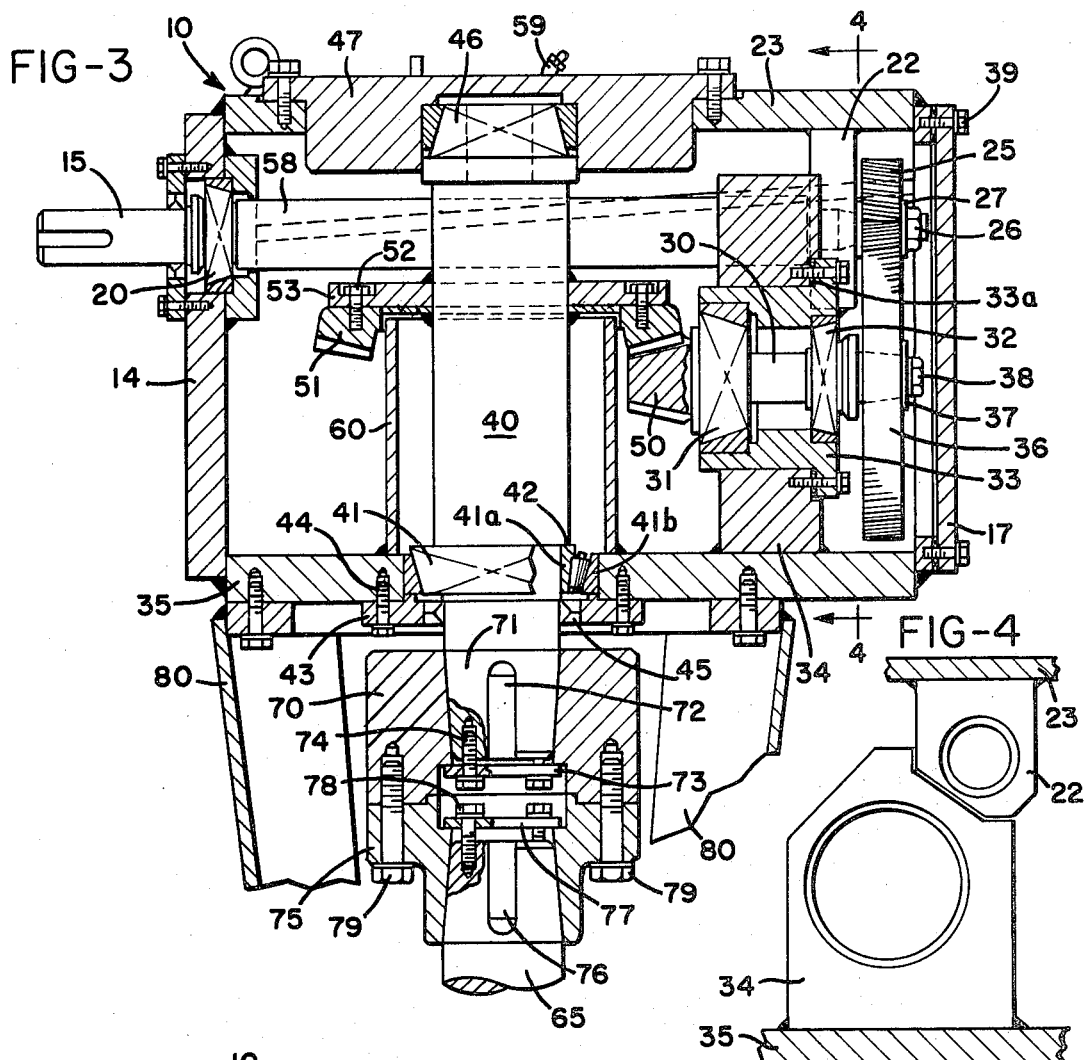
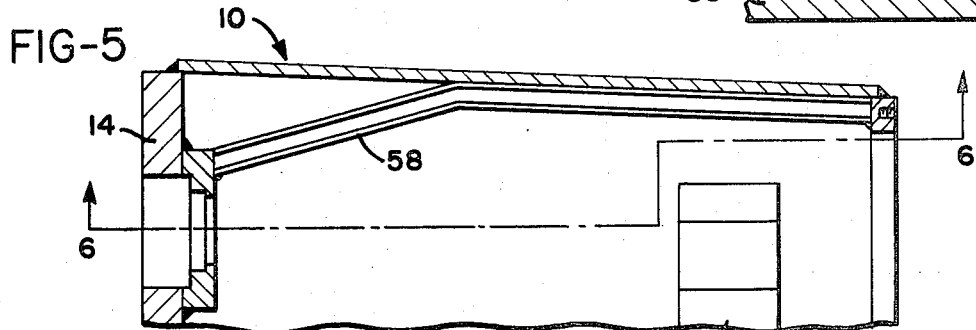
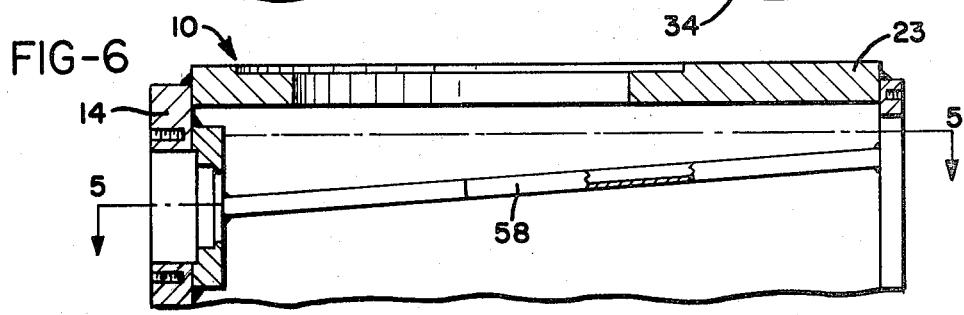

RIGHT ANGLE SPEED REDUCER

CROSS REFERENCE TO RELATED APPLICATIONS

Reference is made to our copending application Ser. No. 315,922 filed on even date herewith and assigned to the assignee of the present application.

BACKGROUND OF THE INVENTION

This invention relates to right angle drives, and more particularly to high torque right angle speed reducers for driving agitators such as mixers and the like.

High torque right angle speed reducers have found wide application as agitator drives where a horizontally disposed prime mover must drive a vertically disposed agitator shaft. Such right angle speed reducers are used in sizes ranging from 1 to 1,000 horsepower, handle torques from 15,000 to $10^6$ inch pounds, deliver output speeds from 1 to 500 rpm, and so on. The often enormous stresses and demands placed on such right angle speed reducers are often increased even further since the speed reducer is commonly used as the sole support for the agitator itself. That is, the agitator is frequently supported within the chamber in which the agitation and mixing take place only by suspension from the speed reducer.

Because of these tremendous demands, prior art devices have usually been bulky, noisy, relatively complicated, and limited in both durability and serviceability. Various advantageous features have been included from time to time in some of these devices, one such feature being a dry well output to protect the contents of the mixing container from contamination by the oil used for lubrication within the right angle drive, another feature being change gears to enable the right angle drive to provide a variety of output speeds for a given input shaft speed, and so on.

Nevertheless, a need still remains for a right angle speed reducer which is readily applicable to the entire range of environmental demands mentioned earlier, which has long life and durability, operates efficiently with a low noise level, and which provides for quick and easy servicing as well as for ready changing of the degree of speed reduction provided.

SUMMARY OF THE INVENTION

Briefly, this invention provides a right angle speed reducer having exceptional compactness, durability, serviceability, and quietness of operation.

The prime mover is attached to a horizontally disposed input shaft which passes through the housing of the speed reducer substantially to the end opposite the end to which the prime mover is attached. The first of a pair of speed change gears is mounted on the end of the input shaft opposite the prime mover. A second speed change gear is mounted nearby on an intermediate shaft and meshes with the first speed change gear.

Since the change gears are located at the end of the housing opposite the prime mover, a removable access plate on the housing adjacent the change gears may be removed easily to provide quick and convenient accessibility to the change gears. The particular reduction ratio of the right angle speed reducer is thus easily changed to suit the particular task at hand.

The intermediate shaft drives a spiral bevel gear reduction which effects the transition from horizontal to vertical rotational motion. The spiral bevel gearing in turn drives the output shaft, which is firmly supported in upright position within the housing. The spiral bevel gearing is a highly efficient gearing and, since it follows the first stage of speed reduction effected by the change gears, also generates relatively low noise.

This invention further incorporates tapered roller bearings throughout, providing exceptionally long life and quiet operation for every shaft within the speed reducer and enabling each shaft to carry greater loads. The use of both the tapered roller bearings and helical and spiral bevel gearing within the reducer also results in especially quiet operation for this invention.

Splash lubrication for all high speed bearings assures adequate lubrication for every such bearing. The low speed bearings, such as those on the output shaft, are lubricated with a heavy lubricant. A dry well output protects the contents of the mixing chamber from contamination by the oil used for the splash lubrication system.

The particular design of this invention provides for exceptionally low head room requirements. For example, the top of the drive extends virtually no higher than the prime mover itself, making this design particularly attractive for crowded applications.

It is therefore an object of this invention to provide a right angle speed reducer for driving an agitator from a horizontally disposed prime mover; a right angle speed reducer incorporating readily accessible change gears; having right angle spiral bevel gearing means; splash lubrication for all relatively high speed shaft bearings; a dry well output for the lower output shaft bearing; all tapered roller bearing shaft bearings; and to accomplish all the above objects and purposes in a configuration having high strength, low cost, compact size, great flexibility in application, exceptionally long life and durability, quiet operation, and being adapted to an extremely wide range of environments and conditions.

Other objects and advantages of the invention will be apparent from the following description, the accompanying drawings and the appended claims.

BRIEF DESCRIPTION OF THE DRAWINGS

FIF. 1 is a partially broken away perspective view of a double reduction right angle speed reducer according to this invention;

FIG. 2 is a side view of the speed reducer of FIG. 1 on a mounting stand and coupled to an agitator shaft;

FIG. 3 is a partial view in vertical section generally in the plane of the output shaft of the reducer of FIG. 2;

FIG. 4 is a fragmentary view taken generally on line 4—4 of FIG. 3;

FIG. 5 is a partial cross-sectional top view taken on line 5—5 of FIG. 6, with portions of the speed reducer omitted for clarity, showing the splash lubrication viaduct for the input shaft bearing adjacent the prime mover; and FIG. 6 is a partial section similar to FIG. 5 and taken on line 6—6 thereof, showing the viaduct with a portion thereof broken away.

DESCRIPTION OF THE PREFERRED EMBODIMENT

With reference to the drawings, and more particularly to FIG. 1, the right angle speed reducer includes a box-like housing 10 on which a prime mover 12, such as an electric motor, is conveniently mounted by a mounting bracket 13 attached to side wall 14 of the housing.

A flexible coupling 16 connects prime mover 12 in driving relationship to an input shaft 15 which passes through side wall 14 and extends entirely across the speed reducer almost to the side wall 17 opposite side wall 14. Input shaft 15 is mounted within housing 10 on a first tapered roller bearing 20 supported in side wall 13 and a second tapered roller bearing 21 supported on an internal bearing support wall 22 depending from the top wall 23 of the housing. The end of the input shaft 15 adjacent wall 17 is splined at 24 slightly beyond tapered roller bearing 21 for receiving a first change gear 25 thereon. Change gear 25 is held on spline 24 by a nut 26 and washer 27 threaded on the outer end of shaft 15. The splined configuration enables the use of very small change gears 25, smaller than would be practical, for example, with a key and slot configuration.

An intermediate shaft 30 is mounted within housing 10 on tapered roller bearings 31 and 32 supported in a cartridge 33 extending through a boss 34 which extends upwardly from the bottom wall 35 of the housing 10 near input shaft 15. The cartridge enables shaft 30 and bearings 31 and 32 to be removed easily for fast and convenient servicing. Shims 33a between cartridge 33 and boss 34 enable the cartridge to be positioned very precisely in boss 34, for reasons further set forth below. The end of intermediate shaft 30 adjacent wall 17 extends beyond bearing 32 and is tapered to receive a second change gear 36 having a complementary tapered bore. Gear 36 is keyed or otherwise locked on the end of the shaft 30, and is held thereon by a washer 37 and bolt 38 threaded into the shaft.

The first and second change gears 25 and 36 are of complementary sizes according to the spacing of shaft 30 from shaft 15, in order to mesh in the desired driving relationship. Wall 17 is attached to housing 10 by means of bolts 39 and may be removed easily when it is desired to replace the change gears 25 and 36 with another set of complementary change gears having a different reduction ratio. By this means, the particular reduction ratio provided by this invention is easily and conveniently changed, simply by removing wall 17 and changing the gears 25 and 36 accordingly. The long input shaft 15, which locates the first change gear 25 near wall 17 facilitates the ease with which the change gears may be changed since the prime mover 12, side wall 14, input shaft 15, and intermediate shaft 30 are able to remain intact at all times. Virtually no disassembly of the reducer is required whenever a reduction ratio change is made.

The output shaft 40 is firmly supported on the bottom wall 35 of housing 10 by a tapered roller bearing 41 having its inner race 41a proportioned to form a seat for the annular shoulder 42 on shaft 40. The outer race 41b is in turn supported on a plate 43 secured by bolts 44 to bottom wall 35 and also retaining a shaft seal 45. The upper end of shaft 40 is supported at substantially right angles to input shaft 15 by a tapered roller bearing 46 retained in the cap 47 of the housing which closes the access opening in top wall 23.

A right angle spiral bevel gearing assembly comprising a driving pinion gear 50 and a driven ring gear 51 forms the driving connection between intermediate shaft 30 and output shaft 40. Driving gear 50 is attached to the end of shaft 30 opposite gear 36 and intermeshes with driven gear 51, which is attached by means of bolts 52 to a driving ring 53 welded to output shaft 40. Since proper meshing of gears 50 and 51 is very important, cartridge 33 and shims 33a mount shaft 30 as a single, easily adjustable sub-assembly. Gear 50 is then easily and precisely positionable with respect to gear 51. The right angle spiral bevel gearing 50-51 is a highly efficient type of gearing which simultaneously provides a stage of speed reduction, effects a right angle change in the drive, and provides very quiet operation.

The input shaft tapered roller bearings 20 and 21 and the intermediate shaft tapered roller bearings 31 and 32 are relatively high speed bearings and are therefore preferably lubricated with an oil type lubricant. This invention therefore incorporates a splash lubrication system which maintains the proper lubrication on these relatively high speed bearings. The splash lubrication oil within housing 10 to a depth of approximately ⅓ of the interior depth of the reducer. Oil level check window 55 is provided in wall 17 for ease in checking and maintaining the proper oil level. The oil itself may be added through an oil filler and breather cap 56 and removed through a magnetic oil drain plug 57.

With such a level of oil maintained within housing 10, the high speed movement of the various gears, such as the change gears 25 and 36, will splash the oil throughout the interior of the reducer, adequately lubricating the bearings near these gears. As shown, however, input shaft bearing 20 is removed some distance from these gears, and the splash lubrication system of this invention therefore includes an oil trough or viaduct 58 (FIG. 5 and 6) extending and sloping from the vicinity of the change gears to the input shaft tapered roller bearing 20. Trough 58 collects splashed lubrication from the vicinity of the change gears and conveys it to bearing 20 to assure proper splash lubrication of all the high speed bearings. Additional lubrication may easily be thrown toward trough 58 by using a much larger washer 27 (not shown) which extends fully across the face of change gear 25 and partially over change gear 36. such a washer will pick up additional oil from gear 36 and sling it toward the trough. This has been found desirable where exceptionally slow input shaft speeds are used, since it assures adequate lubrication for bearing 20.

On the other hand, the output shaft tapered roller bearings 41 and 46 are relatively low speed bearings and are therefore separately lubricated with a heavy grease-type lubricant. The grease-type lubricant may be applied, for example, through fittings such as fitting 59 on housing cap 47.

Since the right angle speed reducer is mounted above the container in which the mixing and agitation take place, the output shaft is provided with a dry well output to protect the contents of the container from the lighter lubrication of the splash lubrication system. The dry well output comprises a cylindrical wall 60 which extends from the bottom 35 of housing 10 up and underneath gear 51. Wall 60 thus extends considerably above the level of the oil maintained within housing 10, and the top of the dry well is protected from the splash lubrication system by gear 51, which extends fully across and down around the upper edge of wall 60. Thus the well within wall 60 remains free of the splash lubrication, and the dry well output prevents the light-weight splash lubricant from reaching the lower output shaft bearing and seal.

FIGS. 1–3 illustrate the means by which the output shaft 40 is coupled to an agitator shaft 65. An upper coupling half 70 having a tapered bore is attached over the tapered end 71 of output shaft 40. Coupling half 70 is interlocked in driving relation with end 71 by a conventional key (not shown) and slot 72, and is retained thereon by a retaining washer 73 and bolts 74.

A lower coupling half 75 is similarly attached to the agitator shaft 65 by a key (not shown) and slot 76, washer 77, and bolts 78. The lower coupling half 75 is then attached to the upper coupling half 70 by means of coupling bolts 79 which pass through half 75 and are threaded into upper coupling half 70.

The speed reducer of this invention may be mounted in any desired fashion to support and drive the agitator shaft as desired. One common mounting system employs a mounting stand such as stand 80 in FIG. 2, the bottom of which may be attached directly to the mixing chamber into which shaft 65 then passes. A seal 82 such as a conventional stuffing box seal is usually provided.

As may be seen, therefore, this invention has numerous advantages. The use throughout of all tapered roller bearings provides for exceptionally long life and durability, greater load capacity, and very quiet operation. The use of high efficiency right angle spiral bevel gearing following the first stage of speed reduction provides not only great efficiency, but also lower noise operation at this stage. The result is a right angle speed reducer having exceptional efficiency, durability, and quietness.

The use of high load, relatively low speed tapered roller bearings on the output shaft 40 enables the right angle speed reducer to drive an agitator shaft, such as shaft 65, without the need for special output shaft supports extending above the main body of the speed reducer. That is, the agitator shaft 65 is generally unsupported within the mixing chamber and derives its sole support from the speed reducer output shaft 40. In the past, elaborate and bulky overhead provisions have often been included on right angle speed reducers to prevent shaft whip and to assure that the speed reducer will have the necessary strength to support the shaft. Such provisions are unnecessary in the present invention, giving it exceptional compactness and making it particularly useful where conditions of low head clearance are encountered.

The ease with which change gears 25 and 36 may be changed, simply by removing wall 17, nut 26, and bolt 38, provides a substantial increase in the utility of this invention over many prior art designs. An absolute minimum of disassembly is required, and the use of splined gear attachment means such as 24 on the input shaft and keyed gear and shaft attachment means such as on the intermediate shaft 30 provides additional operational range capabilities, as well as convenience in changing these gears.

The splash lubrication system provides exceptionally efficient, effective, and uncomplicated lubrication throughout the speed reducer, and requires no additional moving parts. The dry well output, on the other hand, makes the splash lubrication system fully compatible with the use of mixing containers therebeneath.

The overall design is straightforward and uses a minimum of parts, making it readily applicable to an exremely wide range of size, power, and speed requirements. There is essentially no penalty attached to scaling this design upwardly or downwardly.

While the form of apparatus herein described constitutes a preferred embodiment of this invention, it is to be understood that the invention is not limited to this precise form of apparatus, and that changes may be made therein without departing from the scope of the invention.

What is claimed is:

1. A right angle speed reducer for driving an agitator from a power source, comprising:
   a. a housing,
   b. an input shaft,
   c. input shaft bearing means rotatably mounting said input shaft in said housing,
   d. means on said input shaft for drivably receiving a first change gear thereon,
   e. an intermediate shaft rotatably mounted in said housing near said input shaft,
   f. means on said intermediate shaft for drivably receiving a second change gear thereon in driven relationship with a first change gear on said input shaft,
   g. an output shaft,
   h. output shaft bearing means rotatably mounting said output shaft in said housing with the axis thereof substantially at right angles to that of said input shaft,
   i. right angle spiral bevel gearing means having a driving portion and a driven portion,
   j. means drivably connecting said intermediate shaft to said spiral bevel gearing driving portion,
   k. means drivably connecting said output shaft to said spiral bevel gearing driven portion,
   l. splash lubrication means within said housing for lubricating at least said input shaft bearing means, and
   m. dry well output means for protecting the contents of a mixing container located therebeneath.

2. The speed reducer of claim 1 wherein all of said shaft bearing means comprise tapered roller bearings.

3. The speed reducer of claim 1 wherein said output shaft bearing means comprise relatively low speed bearing means, wherein the remaining said bearing means comprise relatively high speed bearing means, and wherein said splash lubrication means includes means for splash lubricating all said relatively high speed bearing means.

4. The speed reducer of claim 3 wherein all said shaft bearing means comprise tapered roller bearings.

5. The speed reducer of claim 1 further comprising adjustable cartridge means mounting said intermediate shaft in said speed reducer for precise adjustment and postioning therein.

6. A right angle speed reducer for driving an agitator from a power source, comprising:
   a. a housing,
   b. an input shaft, c. relatively high speed tapered roller bearings rotatably mounting said input shaft in said housing,
d. means on one end of said input shaft for drivably attaching said input shaft to a prime mover,
e. means on the other end of said input shaft for drivably receiving a first change gear thereon,
f. a cartridge,
g. an intermediate shaft rotatably mounted in said cartridge,
h. means adjustably mounting said cartridge and intermediate shaft in said housing near said input shaft,
i. shim means in said adjustable cartridge mounting means for precise adjustment and positioning thereof in said housing,
j. means on said intermediate shaft for drivably receiving a second change gear thereon in driven relationship with a first change gear on said input shaft,
k. an output shaft,
l. relatively low speed tapered roller bearing means rotatably mounting said output shaft in said housing with the axis thereof substantially at right angles to that of said input shaft,
m. a right spiral bevel gearing means having a driving portion and a driven portion,
n. means drivably connecting said intermediate shaft to said spiral bevel gearing driving portion,
o. means drivably connecting said output shaft to said spiral bevel gearing driven portion,
p. splash lubricating means within said housing for lubricating said relatively high speed bearing means, and
g. dry well output means for protecting the contents of a mixing container located therebeneath.

* * * * *